United States Patent
Bienvenu et al.

(10) Patent No.: US 7,504,750 B2
(45) Date of Patent: Mar. 17, 2009

(54) DEVICE OF PROTECTION AGAINST A POLARITY REVERSAL

(75) Inventors: Philippe Bienvenu, Allauch (FR); Sandra Mattei, Marseille (FR)

(73) Assignee: STMicroelectronics S.A., Montrouge (FR)

( * ) Notice: Subject to any disclaimer, the term of this patent is extended or adjusted under 35 U.S.C. 154(b) by 409 days.

(21) Appl. No.: 10/817,629

(22) Filed: Apr. 1, 2004

(65) Prior Publication Data
US 2004/0222703 A1  Nov. 11, 2004

(30) Foreign Application Priority Data
Apr. 3, 2003  (FR) .................................... 03 04144

(51) Int. Cl.
*H01H 1/60*  (2006.01)
*H02H 3/00*  (2006.01)
(52) U.S. Cl. ........................ 307/138; 361/84; 361/82
(58) Field of Classification Search ................. 307/138; 361/84, 82
See application file for complete search history.

(56) References Cited

U.S. PATENT DOCUMENTS

| | | | | |
|---|---|---|---|---|
| 4,723,191 | A * | 2/1988 | Menniti | 361/92 |
| 4,866,602 | A | 9/1989 | Hall | |
| 5,726,505 | A * | 3/1998 | Yamada et al. | 307/127 |
| 6,525,515 | B1 * | 2/2003 | Ngo et al. | 323/277 |
| 6,611,410 | B1 * | 8/2003 | Makaran | 361/84 |

FOREIGN PATENT DOCUMENTS

DE  199 28 760 A  4/2001

OTHER PUBLICATIONS

Dec. 18, 2003, French Search Report.

* cited by examiner

*Primary Examiner*—Stephen W Jackson
*Assistant Examiner*—Michael Rutland Wallis
(74) *Attorney, Agent, or Firm*—Lisa K. Jorgenson; Bryan A. Santarelli; Graybeal Jackson LLP

(57) ABSTRACT

A device for protecting a circuit against a polarity reversal of a connection to a D.C. power supply, comprising a controllable switch interposed on said connection between a first terminal of a first voltage of the D.C. power supply and a first terminal of the circuit, and first means for turning-off with a delay the switch in the presence of a reverse polarity.

20 Claims, 2 Drawing Sheets

DEVICE OF PROTECTION AGAINST A POLARITY REVERSAL

PRIORITY CLAIM

This application claims priority from French patent application No. 03/04144, filed Apr. 3, 2003, which is incorporated herein by reference.

FIELD OF THE INVENTION

The present invention relates generally to the protection of electronic circuits against a transient polarity reversal of a D.C. supply voltage. The present invention more specifically applies to the protection of circuits for controlling loads supplied by a D.C. battery, for example, in the automobile field.

BACKGROUND OF THE INVENTION

FIG. 1 schematically shows a conventional example of a circuit I for controlling a load 2 (Q) supplied by a battery 3.

Control circuit 1 comprises a switch 11 (generally a MOS transistor) between a D.C. voltage (Vbat) terminal 12 and a terminal 13 of connection of load 2, the other terminal of the load being connected (generally directly) to ground and more generally to the other voltage (terminal 32) of the D.C. power supply than that to which terminal 12 is connected. Circuit 1 generally is an integrated circuit further comprising a terminal 14 of connection to ground and input-output terminals of data exchange (control signals, states, etc.) with a microcontroller 4 (μC). In the example shown, four terminals 15 to 18 of circuit 1, among which at least one input terminal of a (logic) turn-on control signal of switch 11, are provided.

A switch 5 symbolizes a general switch of the electric circuit, for example, actuated by the ignition key of a vehicle. Switch 5 connects positive terminal 31 of battery 3 to terminal 12.

Microcontroller 4 is generally supplied by a voltage regulator 6 (VR) receiving, via switch 5 and a diode 61 having its anode connected to the power switch, the battery voltage, and providing a regulated voltage to microcontroller 4.

Several electric protection elements further equip circuit 1 and its connections.

A first protection element is formed of a zener diode 19, internal to circuit 1, connecting terminals 12 and 14, the anode of diode 19 being connected to terminal 14. Diode 19 aims at protecting the portion of circuit I comprising the control elements of switch 11 by limiting the voltage of terminal 12.

A second element is formed of a diode 7 connecting terminal 14 to terminal 32, and thus to the ground or negative terminal of battery 3, the anode of diode 7 being connected to terminal 14. The function of diode 7 is to prevent a battery short-circuit in case of a polarity reversal. Diode 7 is on in normal operation and ensures the ground connection of circuit 1. It is blocked in case of a polarity reversal of the battery and then prevents diode 19 (in the on state) from connecting terminals 32 and 31, which would be the case if terminal 14 was directly connected to terminal 32.

Diode 7 may be replaced with a resistor that must then be of small value to avoid a significant voltage drop in normal operation. Such a small value however generates a significant dissipation in case of a polarity reversal of the battery.

Diode 7, which may be common to several circuits 1, independently from their consumption, and which generates an approximately constant voltage drop on the order of 0.6 volt, is thus conventionally preferred.

Microcontroller 4 is generally protected against a polarity reversal by diode 61.

Ground terminal 41 of the microcontroller must generally be directly connected to terminal 32. This, to enable it reading, without any voltage offset, data from sensors (not shown) directly connected to the battery "minus" 32.

A disadvantage of diode 7 is that it does not provide a protection of circuit 1 and of microcontroller 4 in case of transient negative pulses on supply terminal 12 (or 31). In the example of application to automobile, transient pulses correspond to normalized transient distrubances (ISO standard T/R 7637/1) of the battery voltage, of variable power. More generally, such transient pulses may be due, for example, to switchings of loads connected to the D.C. power supply.

Upon positive transient pulses on terminal 12, diode 7 remains on. Zener diode 19 then behaves as a voltage limiter and protects the control elements of switch 11.

However, upon negative transient pulses on terminal 12, diode 7 blocks. The internal ground (terminal 14) of circuit 1 then becomes strongly negative (with respect to the voltage of terminal 32). Now, the microcontroller has its ground referenced to terminal 32. As a result, inputs-outputs 15 to 18 follow the negative voltage of the pulse and draw current from the microcontroller. To overcome this phenomenon, each input-output 15 to 18 of circuit 1 is connected to the microcontroller by a protection resistor 45 to 48. The resistors must have a strong value (at least on the order of one KΩ) to ensure this protection function.

A disadvantage is linked to the presence of resistors 45 to 48 and to their bulk. In particular, the miniaturization objectives result in integrating series interfaces in the packages containing circuits 1 to limit connections to the microcontroller. The connections are then preferentially limited to a number of three (a dock connection, an output connection to the microcontroller, and an input connection from the microcontroller). It being series connections, the data interpretation is preferentially performed by digital words.

The presence of the protection resistors on the input-output lines poses another problem, particularly present for series communications, than that of the resistor size. Indeed, the resistors take part in RC cells (with the input or output capacitances, be they or not stray capacitances) that introduce a non-negligible delay in the data transmission between the microcontroller and the load control circuit(s).

In particular, in the application to the automobile field, the required response times are of at least one microsecond, which is incompatible with the use of series resistors on the order of one KΩ or more.

SUMMARY OF THE INVENTION

An embodiment of the present invention provides protection against polarity reversals that overcomes the disadvantages of known devices. In particular, an embodiment of the present invention protects against transient reversals while minimizing the value of the resistors of access to the microcontroller, or even eliminating these resistors.

An embodiment of the present invention also provides a solution that is compatible with the system miniaturization.

An embodiment of the present invention provides an integrable solution.

An embodiment of the present invention provides a device for protecting a circuit to be protected against a polarity reversal of a connection to a D.C. power supply, comprising:

a controllable switch interposed on said connection between a first terminal of application of a first voltage of said D.C. power supply and a first terminal of said circuit; and first means for turning-off with a delay the switch in the presence of a reverse polarity.

According to an embodiment of the present invention, said delay is chosen to be greater than the maximum expected duration of transient polarity reversals.

According to an embodiment of the present invention, the protection device comprises second means for turning on the switch with a delay shorter than the turn-off delay, when the polarity is normal.

According to an embodiment of the present invention, said first terminal of the circuit to be protected is a ground connection terminal.

According to an embodiment of the present invention, said first means are formed of a microcontroller having an output controlling, directly or via a selective delay element, said switch.

According to an embodiment of the present invention, said switch is a MOS transistor, preferably with an N channel.

According to an embodiment of the present invention, said first means are formed of a first resistor connecting the transistor gate to said first terminal of the circuit to be protected.

According to an embodiment of the present invention, a second resistor in series with a diode connects a terminal of the device connected to a second voltage of the D.C. power supply.

According to an embodiment of the present invention, a zener diode is connected in parallel with the first resistor.

Features and advantages of the present invention will be discussed in detail in the following non-limiting description of specific embodiments in connection with the accompanying drawings.

DETAILED DESCRIPTION

Figure 1:
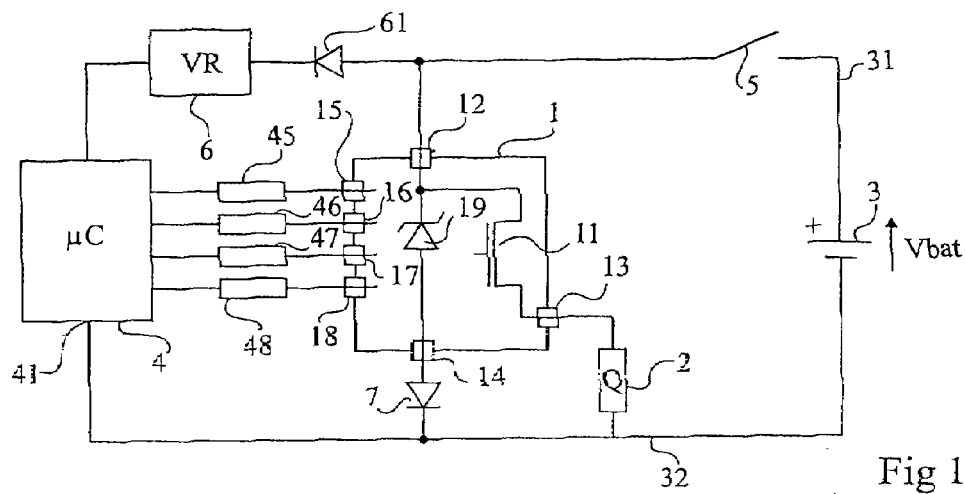
FIG. 1, illustrates a prior-art circuit for controlling a load supplied by a battery.

Same elements have been designated with same references in the different drawings. For clarity, only those elements necessary to the understanding of the present invention have been shown in the drawings and will be described hereafter. In particular, the controlled loads as well as the processes of control by the microcontroller have not been detailed because they may be conventional. Further, embodiments of the present invention will be more specifically described in relation with an example of application to the automobile field, but all described herein applies, unless otherwise specified, to any load supply by a D.C. voltage likely to undergo transient or lasting polarity reversals and posing analog problems.

An embodiment of the present invention provides, between the terminal of ground connection (or more generally of connection to one of the D.C. supply voltages) of a load control circuit and the ground, a specific protection element. This element has the feature of being on in normal operation, of being off in case of a lasting polarity reversal, and of remaining on during transient (temporary) polarity reversals.

Figure 2:
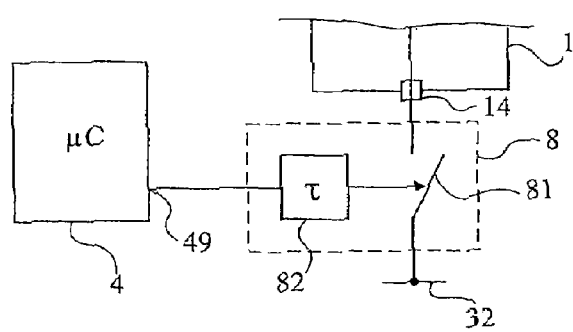
FIG. 2 shows, in the form of functional blocks, an embodiment of a protection device according to the present invention.

FIG. 2 shows a first embodiment of a ground connection protection device according to the present invention. FIG. 2 comprises the elements of a conventional assembly of the type shown in FIG. 1. For simplification, the representation of FIG. 2 is partial, only protection device 8 according to an embodiment of the present invention, microcontroller 4, and a portion of control circuit 1 are been shown.

According to this embodiment, device 8 is functionally formed of a normally-on switch 81, connecting terminal 14 of circuit 1 to ground 32, and of a delay element 82 ($\tau$) delaying the turning-off of switch 81 after a detection of a polarity reversal of the D.C. supply voltage. The detection of a polarity reversal may be performed by microcontroller 4 if said microcontroller has a power supply insensitive to polarity reversals. An output 49 of the microcontroller providing the state (or the direction) of the polarity is then connected to the input of delay element 82 having its output controlling, at least to turn it off, switch 81.

The delay introduced by element 82 is a function of the maximum durations expected for transient disturbances and is thus adjustable to predetermined values appropriate for particular applications. The delay occurs at the turning-off, which enables not taking into account a temporary reversal if the polarity becomes normal again before expiry of the delay set by delay element 82. Preferably, the delay only occurs at the turning-off of switch 81. For example, delay element 82 lets through with no delay a low state (0) indicative of a normal polarity to immediately turn on switch 81, and delays the propagaton of a high state (1) indicative of a polarity reversal. According to an alternative implementaton, the delay of element 82 is calculated by the microcontroller that then directly controls switch 81.

Figure 3:
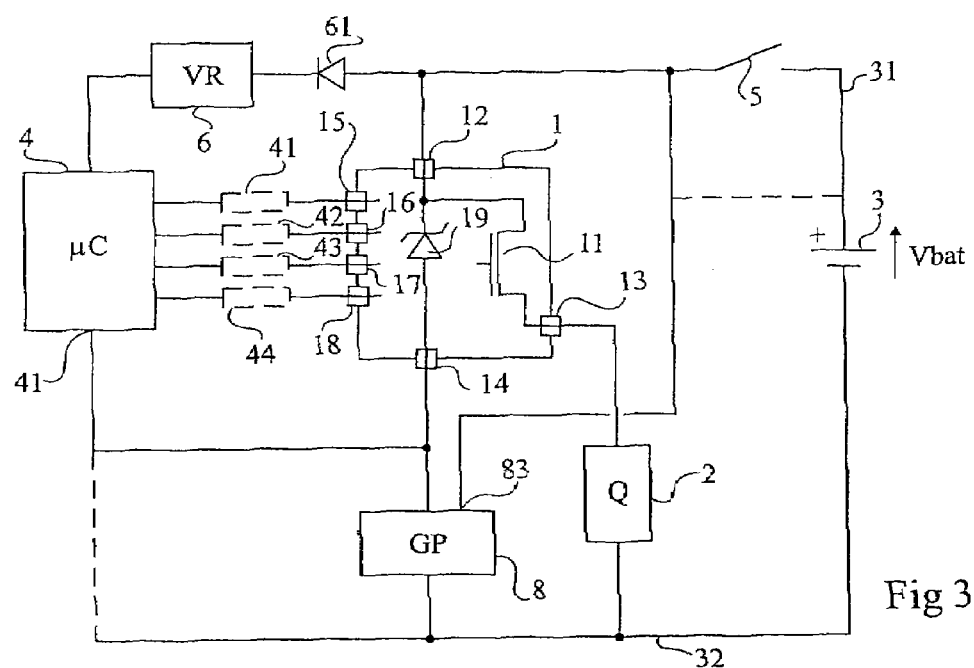
FIG. 3 shows an embodiment of the present invention used in the example of application of FIG. 1.

FIG. 3 shows a second embodiment of a ground connection protection device 8 (GP) according to an embodiment of the present invention. The device connects like that of FIG. 2, except that it itself detects the polarity reversal and comprises for this purpose a terminal 83 for receiving battery voltage Vbat connected, preferably, to the same point as positive supply terminal 12 of circuit 1. As an alternative (shown in dotted lines), terminal 83 for receiving the supply voltage is connected upstream of general switch 5, directly on the positive supply terminal. FIG. 3 thus comprises the elements of FIG. 1, except for diode 7 and resistors 45 to 48. Device 8 comprises a switch 81 (not shown in FIG. 3) and a means equivalent to delay element 82.

The operation of devices 8 of FIGS. 2 and 3 will be described hereafter.

According to an embodiment of the invention, a major difference between protection device 8 and conventional diode 7 is that element 8 blocks with a delay upon occurrence of a polarity reversal. Thus, the assembly operates as follows.

In the presence of a normal supply voltage Vbat (positive between terminals 12 and 32), switch 81 is on, just as diode 7 was previously forward-biased. Diode 19, internal to circuit 1, performs its normal function of control circuit protection for transient pulses.

In this configuration, the voltage drop across conductive element 8 is that of switch 81. In the most frequent case, the switch 81 will be a MOS transistor. An advantage then is that it minimizes the voltage drop between terminals 14 and 32. As illustrated in FIG. 3, this may enable connecting the ground of microcontroller 4 upstream of device 8 (and thus on terminal 14) and thus protecting microcontroller 4 at the same time. Of course, it is not excluded, as an alternative, to keep the conventional ground connection of the microcontroller as illustrated in dotted lines in FIG. 3.

In the presence of a transient negative voltage, switch 81 does not turn off (conversely to diode 7 of the conventional assembly) since delay element 82 (or the equivalent element of device 8 of FIG. 3) is sized to introduce a delay greater than the expected maximum delay of transients to be ignored by the system.

In fact, a current I (defined based on the maximum transient voltage, generally standardized) flows through diode 19 and through switch 81. Assuming an impedance Z in the on state of switch 81, the voltage drop in element 8 is Z.I. The voltage across the assembly then is limited to Z.I+Vf, where Vf designates the voltage across diode 19 (in practice, less than one volt).

As a result, during such a negative transient, the voltage applied to the terminals of microcontroller 4 connected to input-output terminals 15 to 18 of circuit 1 cannot exceed a magnitude of Z.I+Vf.

Switch 81 is sized to hold the maximum current of the most energetic expected transient pulses.

An advantage is that resistors 45 to 48 for protecting the microcontroller inputs-outputs may be reduced according to a ratio of at least 100 (in practice, values on the order of 1Ω or some 10Ω are enough), or even eliminated. In particular, if the microcontroller ground connection is connected to terminal 14 of the circuit, the voltage applied on the microcontroller inputs-outputs is limited to Vf (less than one volt). In the example of FIG. 3, resistors 41 to 44 have been illustrated in dotted lines in the place of resistors 45 to 48.

Another advantage is that it is then possible to provide series connections between the microcontroller and circuit(s) 1 protected by the device 8 while allowing a fast response of the system to orders from the microcontroller.

In the presence of an incidental (lasting) reversal of the supply voltage polarity, switch 81 turns off after time (τ) and the short-circuiting of the power supply by diode 19 internal to circuit 1 is then avoided.

It will be ascertained for the breakdown voltage of the device 8 (and switch 81) to be greater than the maximum reverse voltage that the circuit can see (generally 16 volts in the case of an automobile battery).

A simple embodiment of device 8 is a MOS transistor controlled in all or nothing (for example, 0 or 5 volts) by microcontroller 4, which takes on all of the detection. A still simpler control consists of connecting the gate of the MOS transistor directly to the output (for example, 5 volts) of regulator 6. The turn-off timing then originates from the regulator's capacity of maintaining its output voltage in the case where its input voltage disappears. This embodiment may be used, for example, for applications where it is not indispensable to precisely control the turn-off delay.

Figure 4:
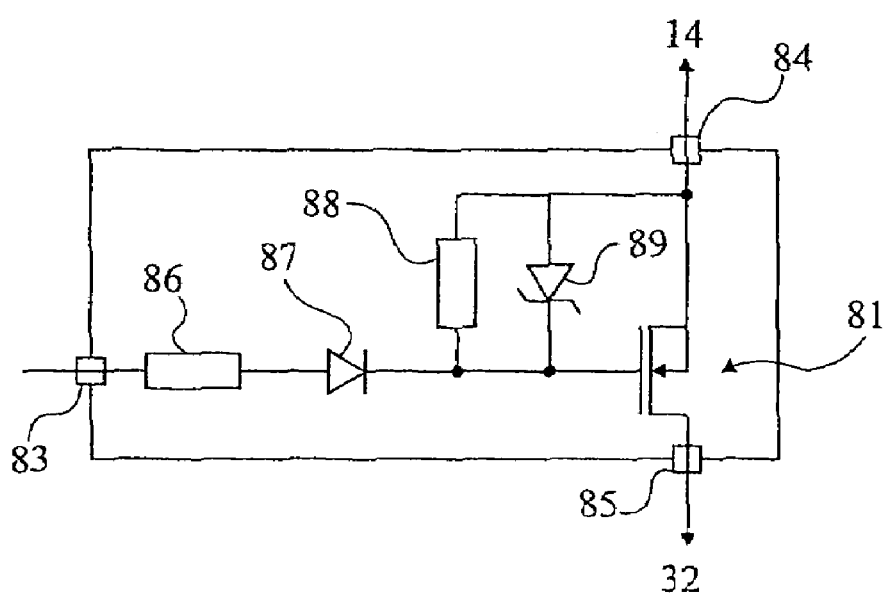
FIG. 4 shows an embodiment of the protection element of the present invention.

FIG. 4 shows a preferred embodiment of device 8 of FIG. 3 according to an embodiment of the present invention (autonomous device integrating the turn-off time constant).

According to this embodiment, preferably implemented as an integrated circuit, switch 81 is an N-channel MOS transistor. The drain of transistor 81 is directly connected to a terminal 84 of device 8 intended to be connected to ground connection terminal 14 of circuit 1 to be protected. Its source is directly connected to a terminal 85 of device 8 intended to be directly connected to ground 32 (or to the most negative terminal of the power supply). The gate of transistor 81 is connected, via a first resistor 86 in series with a diode 87, to detection input terminal 83. The cathode of diode 87 is directly connected to the gate of transistor 81 while its anode is connected, by resistor 86, to terminal 83. The gate of transistor 81 is further connected to terminal 84 by a second resistor 88, preferably greater than the value of resistor 86.

When a positive voltage is present on terminal 83 (positive supply voltage), diode 87 conducts and transistor 81 is on.

In the case of a polarity reversal of voltage Vbat, diode 87 immediately blocks. Transistor 81 however remains on for as long as resistor 88 has not discharged its gate capacitance. If the polarity reversal is transient, the transistor gate has no time to discharge. When the transient disturbance disappears, diode 87 becomes conductive again and transistor 81 is back on. The turning-on of transistor 81 is conditioned by the charge of its gate capacitance through resistor 86.

If the polarity reversal carries on, transistor 81 turns off, which prevents the short-circuiting of the power supply.

The value of resistor 88 is set according to the gate capacitance of transistor 81 and to the maximum duration of the transient polarity reversals for which the circuit is not desired to be turned off (for example, to have a time constant on the order of one millisecond).

Preferably, a zener diode 89 connects the gate of transistor 81 to terminal 84, its anode being connected to terminal 84. The function of this diode is to limit the gate-source voltage of transistor 81 when said transistor is on to the threshold voltage of diode 89 plus the gate-source voltage of transistor 81. Also, the diode 89 limits the gate-drain voltage of the transistor 81 to the diode's zener voltage during a transient polarity reversal.

In the case of the use of an N-channel MOS transistor as a switch 81, it will be ascertained to connect the bulk to the drain to avoid, by a connection of the bulk to the source, the presence of a parasitic diode that would be forward-biased during polarity reversals.

The value of resistor 86 is, preferably, selected to be as small as possible (for example, at least ten times smaller than that of resistor 88. Resistor 86 may even be omitted if the voltage on terminal 83 does not risk exceeding the avalanche voltage of diode 89, resistor 86 of which limits its current. Since resistor 86 has a value smaller than that of resistor 88, the turning-on is faster than the turning-off. This especially enables respecting the required speeds for the starting of circuit 1 (or the restarting after a transient disturbance).

Another advantage of device 8 of FIG. 4 appears on disappearing of the supply voltage (for example, on turning-off of general switch 5). Indeed, the turn-off delay of switch 81 with respect to this disappearing of the supply enables carrying off a residual current into load 2. Such is the case, in particular, if load 2 is at least partially inductive. Conductive switch 81 is used as a free wheel element (provided that switch 11 of circuit 1 also remains on) on turning-off of general switch 5, conversely to conventional diode 7 that instantaneously blocks. The occurrence of overvoltages at the level of switch 5 (for example, the ignition key of a vehicle) likely to generate an arc thereacross is thus avoided.

The protection device 8 may be part of a discrete circuit or integrated circuit that is located in a system, such as the electrical system of an automobile.

Of course, the present invention is likely to have various alterations, modifications, and improvements. In particular, a protection device may be provided on the connection to the most positive voltage. In this case, a P-channel MOS transistor maybe provided on the positive supply side.

Further, the sizing of the different components of the device 8 is within the abilities of those skilled in the art based on the functional indications given hereabove.

Finally, although the above embodiments of the present invention have been described in relation with a single control circuit and a single protection device, a same protection device may be shared by several different charge control circuits.

Such alterations, modifications, and improvements are intended to be part of this disclosure, and are intended to be within the spirit and the scope of the present invention. Accordingly, the foregoing description is by way of example only and is not intended to be limiting.

The invention claimed is:

1. A device for protecting a circuit against a polarity reversal of a connection to a D.C. power supply, the device comprising:
    a controllable switch interposed on said connection between a first terminal of a first voltage of said D.C. power supply and a first terminal of said circuit; and
    first resistor delay means coupled to the controllable switch for turning-off the switch with a turn-off delay in the presence of a reverse polarity; and
    second resistor delay means coupled to the controllable switch for turning on the switch with a turn-on delay shorter than the turn-off delay, when the polarity is normal.

2. The device of claim 1, wherein said turn-off delay is chosen to be greater than a duration of transient polarity reversals.

3. The device of claim 1, wherein said first terminal of the circuit to be protected is a ground connection terminal.

4. The device of claim 1, wherein said first means comprise a microcontroller having an output controlling, directly or via a selective delay element, said switch.

5. The device of claim 1, wherein said switch is a MOS transistor with an N channel.

6. The device of claim 5, wherein said first means comprise a first resistor connecting the gate of the transistor to said first terminal of the circuit to be protected.

7. A device for protecting a circuit against a polarity reversal of a connection to a D.C. power supply, the device comprising:
    a controllable switch interposed on said connection between a first terminal of a first voltage of said D.C. power supply and a first terminal of said circuit; and
    first means for turning-off the switch with a turn-off delay in the presence of a reverse polarity; and
    second means for turning on the switch with a turn-on delay shorter than the turn-off delay, when the polarity is normal;
    wherein said switch is a MOS transistor with an N channel;
    wherein said first means comprise a first resistor connecting the gate of the transistor to said first terminal of the circuit to be protected; and
    wherein a second resistor in series with a diode connects a terminal of the device connected to a second voltage of the D.C. power supply.

8. The device of claim 7, wherein a zener diode is connected in parallel with the first resistor.

9. A circuit, comprising:
    a switch operable to conduct a current to a first node of a power supply when the first node has a predetermined polarity relative to a second node of the power supply;
    a first delay element coupled to the switch and operable to disable the switch from conducting current at a first predetermined time after the polarity reverses; and
    a second delay element coupled to the switch and operable to enable the switch to conduct current at a second predetermined time after the polarity returns to the predetermined polarity, the second predetermined time being shorter than the first predetermined time.

10. The apparatus of claim 9 wherein the first delay element disables the switch in response to a normal condition of the current.

11. The apparatus of claim 9, further comprising a third delay element disabling the switch in response to a normal condition of the current.

12. The apparatus of claim 9 wherein:
    the switch comprises a transistor; and
    the first delay element is operable to discharge the gate capacitance of the transistor.

13. A method, comprising:
    conducting a current between first and second supply nodes when the first node has a predetermined polarity relative to a second node;
    disabling the conducting of current via a first resistor delay element at a first predetermined time after the polarity inverts; and
    enabling the conducting of current via a second resistor delay element at a second predetermined time after the polarity returns to the predetermined polarity, the second predetermined time being shorter than the first predetermined time wherein the enabling and disabling of current between the first and second node is provided via a controllable switch.

14. The method of claim 13 wherein disabling the conducting comprises transmitting a signal.

15. The method of claim 13 wherein the conducting of current is disabled in response to a normal condition of the current.

16. The method of claim 13 wherein the first and second supply nodes are coupled to a DC power supply.

17. A system, comprising:
    a load;
    a power supply coupled to the load;
    a switch operable to conduct a current to a first node of the power supply when the first node has a predetermined polarity relative to a second node of the power supply;
    a first delay element coupled to the switch and operable to disable the switch from conducting current at a first predetermined time after the polarity reverses; and
    a second delay element coupled to the switch and operable to enable the switch to conduct current at a second predetermined time after the polarity returns to the predetermined polarity, the second predetermined time being shorter than the first predetermined time.

18. A vehicle, comprising:
    a system, comprising:
    a load;
    a power supply coupled to the load;
    a switch operable to conduct a current to a first node of the power supply when the first node has a predetermined polarity relative to a second node of the power supply;
    a first delay element coupled to the switch and operable to disable the switch from conducting current at a first predetermined time after the polarity reverses; and
    a second delay element coupled to the switch and operable to enable the switch to conduct current at a second predetermined time after the polarity returns to the predetermined polarity, the second predetermined time being shorter than the first predetermined time.

19. The vehicle of claim 18 wherein the power supply is a DC power supply.

20. An integrated circuit, comprising:
    a switch operable to conduct a current to a first node of a power supply when the first node has a predetermined polarity relative to a second node of the power supply;

a first delay element coupled to the switch and operable to disable the switch from conducting current at a first predetermined time after the polarity reverses; and a second delay element coupled to the switch and operable to enable the switch to conduct current at a second predetermined time after the polarity returns to the predetermined polarity, the second predetermined time being shorter than the first predetermined time.

* * * * *